Jan. 27, 1970  A. W. KURZ, JR  3,492,065
ADJUSTING MECHANISM FOR A REMOTELY CONTROLLED REARVIEW MIRROR
Filed Oct. 11, 1967  2 Sheets-Sheet 1
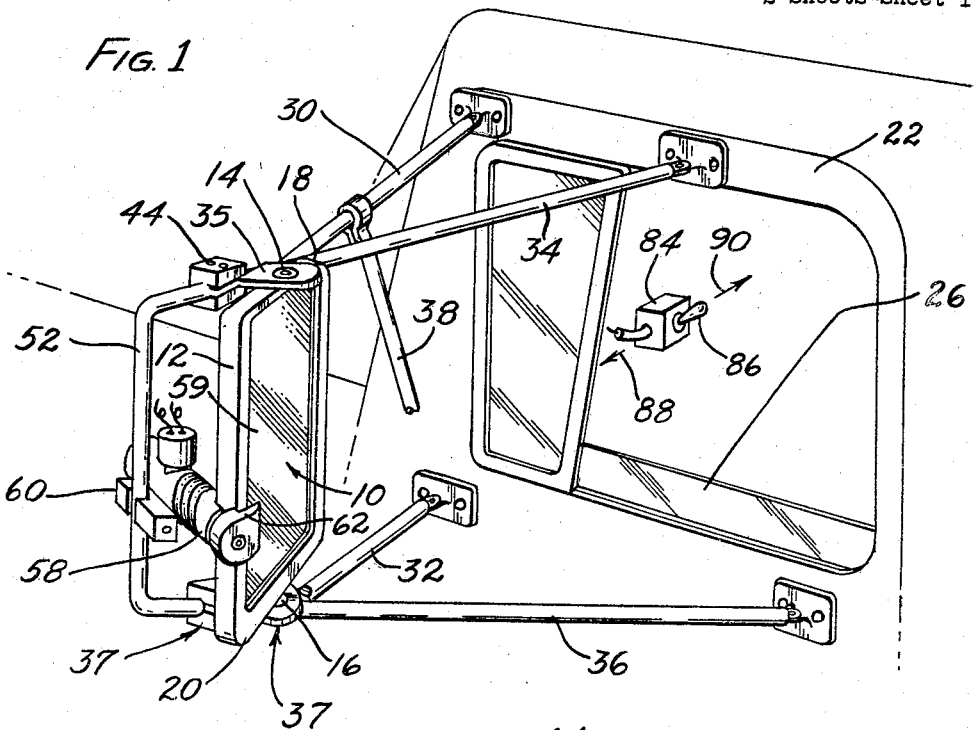
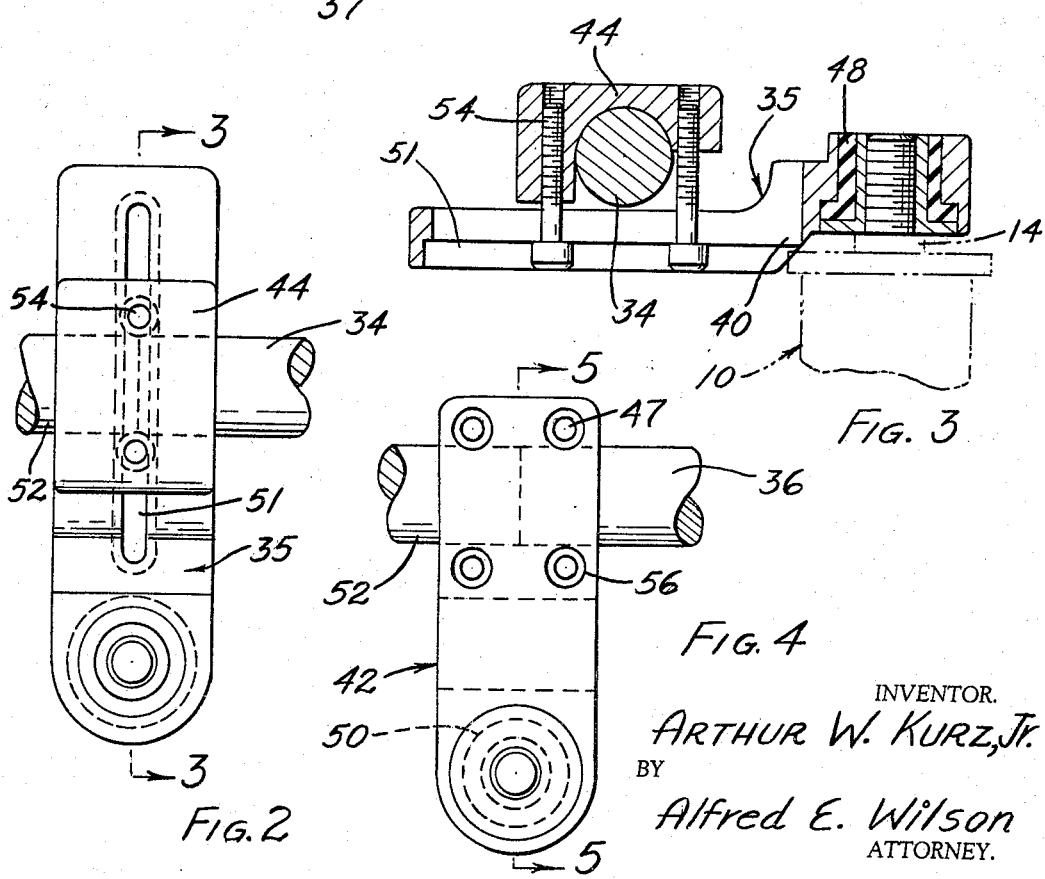
INVENTOR.
ARTHUR W. KURZ, Jr.
BY
Alfred E. Wilson
ATTORNEY.

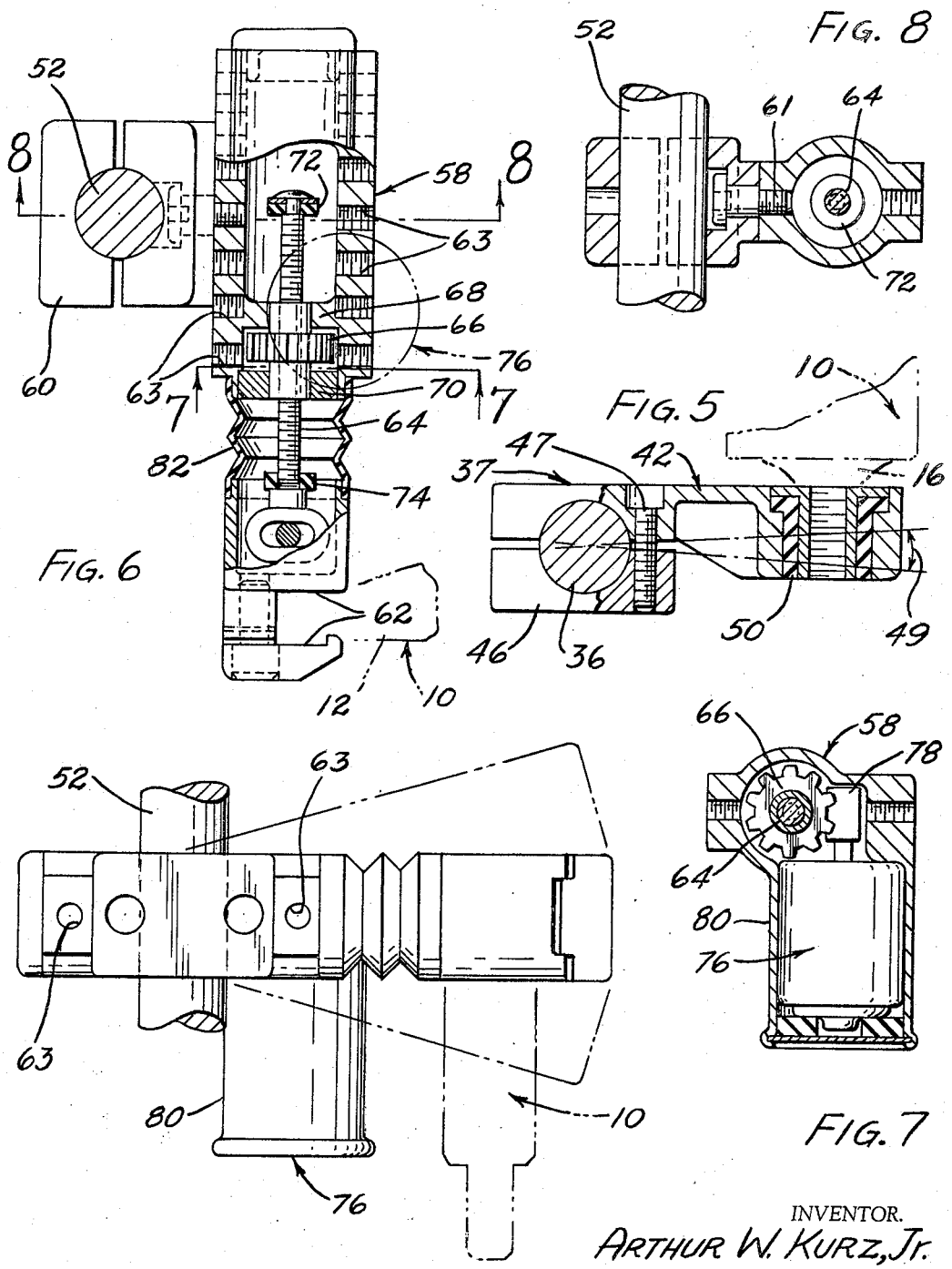

United States Patent Office

3,492,065
Patented Jan. 27, 1970

---

3,492,065
ADJUSTING MECHANISM FOR A REMOTELY CONTROLLED REARVIEW MIRROR
Arthur W. Kurz, Jr., 3871 Wedgewood,
Birmingham, Mich. 48010
Filed Oct. 11, 1967, Ser. No. 674,530
Int. Cl. G02b 5/08, 5/12
U.S. Cl. 350—289      5 Claims

---

ABSTRACT OF THE DISCLOSURE

A control device for changing the angular adjustment of a vertically elongated rear view mirror, hingedly mounted about a vertical axis on a wide vehicle of the truck and bus type, wherein an expensive connector is interposed between the mirror and a support, and an electric motor carried by a support is provided to actuate the expansible connector, and the electric motor is controlled by a manually operable switch in the driver's compartment.

---

This invention relates to rear view mirrors for vehicles, and more particularly to the control, from a remote point, of the relatively large rear view mirrors that are used on trucks and busses.

It is imperative that rear view mirrors be used in driving trucks because it is impossible for the driver to observe road and traffic conditions behind the truck. On large trucks the mirrors are of necessity positioned so far out from the side of the cab that it is impossible for the driver to reach the mirrors from the driver's compartment to adjust their positions.

In order to avoid the necessity of adjusting the position of rear view mirrors in two planes it is customary to employ relatively high mirrors, approximately 10″ or more in the vertical dimension. Such mirrors accommodate drivers of varying stature and permit drivers to sit in different positions, and it is not necessary to adjust the mirrors about a horizontal axis. With mirrors of this type it is only necessary to adjust the mirrors about the vertical axis in order to permit the driver to observe road and traffic conditions behind the vehicle.

An object of my invention is to provide readily operable controls which may be manipulated from the driver's position to permit him to shift the angular position of mirrors on opposite sides of the vehicle without moving from the driving position.

A further object of my invention resides in the provision of electrically actuated extensible links which may be interposed between one edge of the vertically pivoting mirrors and fixed bars whereby the driver of the vehicle may, by merely operating switch control members located at the driver's position, adjust the mirrors on opposite sides of the vehicle to any desired extent.

Another object of my invention is to provide an improved mirror control whereby the driver can readily move the mirrors to observe road and traffic conditions behind the vehicle, and on both sides thereof, and to enable him to watch the rear wheels, even while driving.

In the drawings wherein similar reference characters refer to similar parts throughout the several views;

FIGURE 1 is a perspective view illustrating my invention as applied to rear view mirrors of the truck type.

FIGURE 2 is a plan view of the upper pivot arm for the mirror.

FIGURE 3 is a sectional view taken substantially on the line 3—3 of FIGURE 2, looking in the direction of the arrows.

FIGURE 4 is a lower plan view of the lower pivot arm for the mirror.

FIGURE 5 is a sectional view, taken substantially on the line 5—5 of FIGURE 4, looking in the direction of the arrows.

FIGURE 6 is a part sectional view, illustrating my improved mirror adjusting mechanism.

FIGURE 7 is a sectional view, taken substantially on the line 7—7 of FIGURE 6, looking in the direction of the arrows.

FIGURE 8 is a sectional view taken substantially on the line 8—8 of FIGURE 6, looking in the direction of the arrows.

FIGURE 9 is a side elevational view of the mirror adjusting mechanism.

Referring now more particularly to FIGURE 1, a rear view mirror 10 preferably formed of glass has a reflective surface. The mirror is of rectangular shape having a height to width ratio of approximately 2 to 1 or more, the vertical or long dimension being generally in excess of 10″. The mirror 10 is relatively heavy to withstand the vibration and shocks to which it is subjected, and it is mounted in a heavy protective frame 12. Resilient liner material such as a strip of rubber may be interposed between the mirror 10 and the frame 12 to cushion and absorb vibration and shocks.

The van or trailer bodies of trucks and the passenger compartments of busses are so wide that it is necessary that the mirrors be positioned as far out as possible to permit the driver to see beyond the sides of the vehicle to observe road and traffic conditions along the side and to the rear of the vehicle.

In view of the long vertical height of the mirror 10 it is unnecessary to adjust the mirror about a horizontal axis. The mirrors 10 are mounted on the doors on opposite sides of the vehicle and may be adjusted about vertical axes to enable the driver to observe conditions close to the sides of the vehicle or spaced further therefrom as desired by the driver. The frame 12 of the mirror is provided with vertically extended pivots 14 and 16 at substantially the mid-points of the upper and lower frame members 18 and 20.

A pair of front upper and lower mirror support arms 30 and 32 are suitably secured to the door 22, as by bolts or screws, the arm being secured above the window opening 26, and the arm 32 being secured beneath the window opening. A pair of rear upper and lower mirror support arms 34 and 36 are also suitably secured to the door 22, the arm 34 being secured above the window opening, and the arm 36 being secured beneath the window. The upper front and rear arms 30 and 34 are angularly disposed relative to each other and are secured together and to a bracket 35 which receives the upper pivot 14 carried by the top member of the frame member 12. The lower front and rear arms 32 and 36 are also angularly disposed relative to each other and are secured together and to a bracket 37 at the lower pivot 16 carried by the lower member 20 of the frame member 12.

Any desired number of brace members such as the member 38 extending from the lower support arms or from the lower support arms or from the door 22 of the vehicle to the upper arms 30 or 34 may be employed to strengthen and rigidify the mirror supporting linkage. It will be noted that the front upper and lower arms 30 and 32 extend substantially perpendicular to the side of the door 22 and that the rear arms 34 and 36 extend at an acute angle relative thereto. By this linkage arrangement it is possible to position the mirror 10 well forwardly relative to the window opening 26 so that it may readily be viewed by the driver of the vehicle. It will be apparent that if desired one or more braces extending from the top adjacent the door 22 downwardly and outwardly may be employed to further strengthen and rigidify the mirror support linkage. If desired the support arms 30, 32, 34 and 36 may be of the telescoping type to permit adjustment of the lateral distance from the side of the door 22 to the mirror 10.

Referring now to FIGURES 2 to 5 it will be noted that the brackets 35 and 37 have lateral extensions 40 and 42 having suitable clamps 44 and 46 to receive and clamp the rear upper and lower support arms 34 and 36.

The clamp 46 of the bracket 37 being secured to the support bar 36 or the protector bar 52 by the use of screws 47 allows for an approximately 10° variation of alignment as shown by the angle 49. It will be noted that the bracket 35, FIGURES 2 and 3, has a slot 51 to permit adjustment of the mirror in a vertical plane about the axis of the bracket 37.

The lateral extensions 40 and 42 have resilient bushings 48 and 50 formed of rubber or other resilient material to receive the upper and lower pivots 14 and 16 of the mirror frame 12. The use of the resilient bushings as a mounting for the mirror pivots 14 and 16 provides a substantially friction free mounting, free from binding which could prevent the assembly from operating smoothly under all conditions.

As shown in FIGURE 1, a C-shaped protector bar 52 is aligned with the rear upper and lower support arms 34 and 36, and is disposed forwardly of the mirror 10. Spaced fasteners may be employed to secure the protector bar 52 as an extension of the rear upper and lower support arms 34 and 36. It will of course be apparent that the protector bar 52 can be aligned with the front bars 30 and 32 if desired.

An actuating mechanism consisting of an electrically actuated expansible connector 58 is interposed between one side 59 of the frame 12 and a fixed element such as the protector bar 52 of the mirror mounting structure. The connector 58 has a clamp 60 to engage the bar 52. The clamp 60 may be secured in any of a plurality, for example seven positions indicated by the threaded holes 63 in FIGURE 9 to accommodate mirrors of different configurations. The clamp 60 may be secured to the connector 58 by a stud 61. This connection compensates for any slight misalignment between the parts. A plurality of similar threaded apertures are provided on the opposite side of the connector 58 for use when my improved control mechanism is applied to a mirror on the opposite or right hand side of the vehicle.

As shown in FIGURES 6 and 7, the expansible connector 58 has a threaded shaft 64 secured as by a pin in the jaw type clamp 62. The opposite end of the connector 58 has a gear 66 provided with internal threads engaging the threads of the shaft 64. The gear 66 is interposed between a flange 68 in the connector 58 and an abutment 70 staked or otherwise secured in the connector 58. Spaced bumpers 72 and 74 positioned at opposite ends of the shaft 64 are provided to engage the flange and the abutment 70 to limit movement of the shaft 64 and the clamp 62 respectively in opposite directions.

An electric motor 76 has a worm gear 78 engaging the gear 66 to move the shaft 64 axially in the connector 58 to move the frame 12 and the mirror 10 relative to the protector bar 52 to adjust the position of the mirror about the vertical axis. The electric motor 76 is housed within a casing 80 carried by the housing of the connector 58, and is driven from the electrical system of the vehicle. A boot 82 is provided to seal the space between the movable members of the connector 58 and to prevent dust from contacting the movable parts of the mechanism.

The device may be actuated by a control switch 84 positioned in the driver's compartment, and having a lever 86 spring biased to a central off position and movable in opposite directions to move the mirror 10 about the vertical axis 14–16 as illustrated in FIGURE 1. Where mirrors on opposite sides of the truck or other vehicle are employed, as is customary, two control switches 84 are employed, one to control each of the mirrors on opposite sides of the vehicle.

OPERATION

The operation is as follows. To move the mirror 10 in the clockwise direction as viewed in FIGURE 1 to enable the driver to observe road and traffic conditions further away from the vehicle on the left hand side, and closer to the vehicle where a mirror is employed on the right hand side, the lever 86 of the control switch 84 is moved toward the left in the direction of the arrow 88. The electric motor 76 then drives the gear 66 to move the threaded shaft 64 inwardly in the connector 58 to move the clamps 60 and 62 toward each other thereby moving the mirror 10 in the clockwise direction about its pivot 14–16.

To move the mirror 10 in the opposite direction to permit the driver to observe the road closer to the vehicle on the left hand side, and further from the vehicle when the mirror is used on the right hand side, the lever 86 is moved toward the right in the direction of the arrow 90. The electric motor 76 is then driven in the opposite direction to rotate the gear 66 to move the threaded shaft 64 in the opposite direction to lengthen the distance between the clamps 60 and 62 to rotate the mirror 10 in the counterclockwise direction about the pivots 14–16 thereby shifting the field of vision to the left.

Attention is directed to the fact that I have devised a mirror actuating mechanism which can readily be applied to mirrors already in service on trucks and busses. With this improved control it is unnecessary for the driver to have an assistant to help in the adjustment of the mirror, and due to the ease with which adjustments can be made, much greater use is made of mirrors in the operation of trucks and busses, with the attendant increase in safety. My improved mirror actuating device is available as an economical accessory, and can readily be applied to trucks and busses already in use.

I claim:

1. In a rear view mirror assembly for a wide vehicle of the truck and bus type having a driver's compartment, a rear view mirror, arm means adapted to be secured to the vehicle and providing spaced pivot connections to hingedly mount the mirror about an axis, wherein the improvement comprises an actuating mechanism for maneuvering the mirror about the pivots, the actuating mechanism including an expansible connector having at the opposite ends releasable connections with the mirror and the arm means, one of the releasable connections being of a C-shaped configuration, an electric motor operatively connected to the expansible connector so as to selectively vary the connection between the mirror and the arm means to thereby maneuver the mirror, a manually operable switch in the driver's compartment for controlling the electric motor, a fixed protector bar for the mirror, and wherein the releasable connections for the expansible connector include axially aligned clamps respectively connecting the expansible connector to the fixed protector bar and to the pivotally mounted mirror, and the expansible connector includes relatively rotatable shaft and gear members interposed between the axially aligned clamps for varying the axial spacing therebetween, the electric motor is arranged to drive one of the shaft and gear members, and the control switch includes a lever to selectively activate the motor to rotate in opposite directions to pivot the mirror about its vertical axis.

2. The invention defined in claim 1 wherein the shaft member is connected to the clamp to the rearview mirror and the gear member is rotatably carried by the clamp to the protector bar.

3. The invention defined in claim 2 wherein the electric motor drives the gear member to cause the expansible connector to move the rear view mirror angularly about the vertical axis in the direction in which the lever of the control switch is moved.

4. The invention defined in claim 1 wherein the arm means includes upper and lower support arms having respectively joined thereto upper and lower clamps, the upper and lower clamps each having self-aligning bushings for pivotally supporting the mirror at the upper and lower ends thereof which are mounted in the upper and lower clamps.

5. The invention defined in claim 4 wherein both the upper and lower clamps include means for adjustment of the mirror about a horizontal axis.

References Cited

UNITED STATES PATENTS

| | | | |
|---|---|---|---|
| 2,330,444 | 9/1943 | Park | 350—304 |
| 3,005,384 | 10/1961 | Baird et al. | 350—289 |
| 3,075,431 | 1/1963 | White | 350—289 |
| 3,132,201 | 5/1964 | Bertell et al. | |

DAVID SCHONBERG, Primary Examiner

J. W. LEONARD, Assistant Examiner